(12) United States Patent
Pinto et al.

(10) Patent No.: US 6,706,433 B2
(45) Date of Patent: *Mar. 16, 2004

(54) REFUELABLE ELECTROCHEMICAL POWER SOURCE CAPABLE OF BEING MAINTAINED IN A SUBSTANTIALLY CONSTANT FULL CONDITION AND METHOD OF USING THE SAME

(76) Inventors: Martin Pinto, 2320 Rising Glen Way, Carlsbad, CA (US) 92008; Stuart Smedley, 241 Camino Del Postigo, Escondido, CA (US) 92025; Jeffrey A. Colborn, 2015 Edinburg Ave., Cardiff-by-the-Sea, CA (US) 92007

( * ) Notice: Subject to any disclaimer, the term of this patent is extended or adjusted under 35 U.S.C. 154(b) by 236 days.

This patent is subject to a terminal disclaimer.

(21) Appl. No.: 09/969,370

(22) Filed: Oct. 1, 2001

(65) Prior Publication Data

US 2002/0045075 A1 Apr. 18, 2002

Related U.S. Application Data

(63) Continuation of application No. 09/521,392, filed on Mar. 8, 2000, now Pat. No. 6,296,958.

(51) Int. Cl.[7] .......................... H01M 2/36; H01M 8/04; H01M 12/06
(52) U.S. Cl. ............................ 429/15; 429/27; 429/70; 429/72
(58) Field of Search ........................... 429/15, 27, 49, 429/51, 68, 70, 72, 80, 81, 101, 229; 141/102

(56) References Cited

U.S. PATENT DOCUMENTS

| | | | |
|---|---|---|---|
| 3,663,298 A | 5/1972 | McCoy et al. | 136/31 |
| 3,811,952 A | 5/1974 | Siwersson et al. | 136/86 |
| 3,847,671 A | 11/1974 | Leparulo et al. | 136/86 |
| 3,902,918 A | 9/1975 | Pompon | 136/86 |
| 3,981,747 A | 9/1976 | Doniat et al. | 429/15 |

(List continued on next page.)

FOREIGN PATENT DOCUMENTS

| | | | |
|---|---|---|---|
| FR | 2639767 | 6/1990 | |
| FR | 2669775 | 5/1992 | |
| JP | 51-49439 | 10/1974 | 429/70 |
| WO | WO 01/06592 | 1/2001 | |

OTHER PUBLICATIONS

Cooper et al., *Demonstration of a Zinc/Air Fuel Battery to Enhance the Range and Mission of Fleet Electric Vehicles*; LLNL Reprint, Paper No. AIAA; 94–3841; 8 pages, Aug. 8, 1994.

(List continued on next page.)

*Primary Examiner*—Susy Tsang-Foster
(74) *Attorney, Agent, or Firm*—Howrey Simon Arnold & White LLP

(57) ABSTRACT

A refuelable electrochemical power source includes one or more electrochemical cells adapted to employ particulate material electrodes. The one or more cells include a cell body defining an interior cell cavity, a flow path in the cell cavity through which particulate material and fluid flow, an electroactive zone within the cell cavity, and a fluid mechanic device adjacent or within the flow path capable of filling the electroactive zone or maintaining the electroactive zone in a constantly full or maximum electroactivity condition. A method for filling or maintaining one or more cells of a refuelable electrochemical power source at a constantly full condition includes providing the above-described apparatus and constantly, periodically, or intermittently circulating particulate material and fluid through the flow path in the one or more cells, past the fluid mechanic device, so that the electroactive zone of the one or more electrochemical cells is maintained in a constantly full or maximum electroactivity condition.

5 Claims, 6 Drawing Sheets

U.S. PATENT DOCUMENTS

| | | |
|---|---|---|
| 3,985,581 A | 10/1976 | Stachurski et al. ............ 429/51 |
| 4,172,924 A | 10/1979 | Warszawski ................. 429/15 |
| 4,182,383 A | 1/1980 | Adomitis et al. .............. 141/5 |
| 4,198,475 A | 4/1980 | Zaromb ....................... 429/15 |
| 4,287,273 A | 9/1981 | Harney et al. .............. 429/153 |
| 4,730,153 A | 3/1988 | Breting et al. ................ 320/14 |
| 4,842,963 A | 6/1989 | Ross, Jr. ..................... 429/21 |
| 5,006,424 A | 4/1991 | Evans et al. .................. 429/15 |
| 5,168,905 A | 12/1992 | Phallen .......................... 141/1 |
| 5,188,911 A | 2/1993 | Downing et al. ............. 429/70 |
| 5,196,275 A | 3/1993 | Goldman et al. ............ 429/27 |
| 5,318,861 A | 6/1994 | Harats et al. ................ 429/21 |
| 5,360,680 A | 11/1994 | Goldman et al. ............ 429/27 |
| 5,378,329 A | 1/1995 | Goldstein et al. ........... 204/115 |
| 5,434,020 A | 7/1995 | Cooper ....................... 429/210 |
| 5,441,820 A | 8/1995 | Siu et al. ..................... 429/17 |
| 5,558,947 A | 9/1996 | Robison ...................... 429/13 |
| 5,569,551 A | 10/1996 | Pedicini et al. ............... 429/27 |
| 5,578,183 A | 11/1996 | Cooper ........................ 205/64 |
| 5,635,051 A | 6/1997 | Salas-Morales et al. .... 205/602 |
| 5,849,427 A | 12/1998 | Siu et al. ...................... 429/19 |
| 5,869,200 A | 2/1999 | Nunnally ..................... 429/10 |
| 5,952,117 A | 9/1999 | Colborn et al. ............... 429/27 |
| 6,153,328 A | 11/2000 | Colborn ....................... 429/51 |
| 6,296,958 B1 * | 10/2001 | Pinto et al. ................... 429/15 |

OTHER PUBLICATIONS

Cooper et al., *A Refuelable Zinc/Air Battery for Fleet Electric Vehicle Propulsion*, SAE International, Paper No. 951948; Aug. 7–10, 1995.

Unknown Author, *How the Zinc/Air Battery is Refueling the Competitiveness of Electric Vehicles*, LLNL Publication, Science & Technology Review, Oct., 1995, pp. 7–13.

* cited by examiner

REFUELABLE ELECTROCHEMICAL POWER SOURCE CAPABLE OF BEING MAINTAINED IN A SUBSTANTIALLY CONSTANT FULL CONDITION AND METHOD OF USING THE SAME

This is a continuation of U.S. patent application Ser. No. 09/521,392, filed on Mar. 8, 2000, now U.S. Pat. No. 6,296,958 B1, which is hereby fully incorporated by reference herein as though set forth in full.

BACKGROUND OF THE INVENTION

1. Field of the Invention

The present invention relates, in general, to a refuelable electrochemical power source, and in particular, to a refuelable electrochemical power source capable of being maintained in a substantially full or maximum electroactivity condition.

2. Related Art

One of the more promising alternatives to conventional power sources in existence today is the metal/air fuel cell. These fuel cells have tremendous potential because they are efficient, environmentally safe, and completely renewable. Metal/air fuel cells can be used for both stationary and mobile applications, and are especially suitable for use in all types of electric vehicles.

Metal/air fuel cells and batteries produce electricity by electrochemically combining metal with oxygen from the air. Zinc, Iron, Lithium, and Aluminum are some of the metals that can be used. Oxidants other than air, such as pure oxygen, bromine, or hydrogen peroxide can also be used. Zinc/air fuel cells and batteries produce electricity by the same electrochemical processes. But zinc/air fuel cells are not discarded like primary batteries. They are not slowly recharged like secondary batteries, nor are they rebuilt like "mechanically recharged" batteries. Instead, zinc/air fuel cells are conveniently refueled in minutes or seconds by adding additional zinc when necessary. Further, the zinc used to generate electricity is completely recoverable and reusable.

The zinc/air fuel cell is expected to displace lead-acid batteries where higher specific energies are required and/or rapid recharging is desired. Further, the zinc/air fuel cell is expected to displace internal combustion engines where zero emissions, quiet operation, and/or lower maintenance costs are important.

In one example embodiment, the zinc "fuel" is in the form of particles. Zinc is consumed, which releases electrons to drive a load (the anodic part of the electrochemical process). Oxygen from ambient air accepts electrons from the load (the cathodic part). The overall chemical reaction produces zinc oxide, a non-toxic white powder. When all or part of the zinc has been consumed and, hence, transformed into zinc oxide, the fuel cell can be refueled by removing the reaction product and adding fresh zinc particles and electrolyte. The zinc oxide (ZnO) product is typically reprocessed into zinc particles and oxygen in a separate, stand-alone recycling unit using electrolysis. The whole process is a closed cycle for zinc and oxygen, which can be recycled indefinitely.

In general, a zinc/air fuel cell system comprises two principal components: the fuel cell itself and a zinc recovery apparatus. The recovery apparatus is generally stationary and serves to supply the fuel cell with zinc particles, remove the zinc oxide, and convert it back into zinc metal fuel particles. A metal recovery apparatus may also be used to recover zinc, copper, or other metals from solution for any other purpose.

The benefits of zinc/air fuel cell technology over rechargeable batteries such as lead-acid batteries are numerous. These benefits include very high specific energies, high energy densities, and the de-coupling of energy and power densities. Further, these systems provide rapid on-site refueling that requires only a standard electrical supply. Still further, these systems provide longer life potentials, and the availability of a reliable and accurate measure of remaining energy at all times.

The benefits over internal combustion engines include zero emissions, quiet operation, lower maintenance costs, and higher specific energies. When replacing lead-acid batteries, zinc/air fuel cells can be used to extend the range of a vehicle or reduce the weight for increased payload capability and/or enhanced performance. The zinc/air fuel cell gives vehicle designers additional flexibility to distribute weight for optimizing vehicle dynamics.

In a prior art zinc/air fuel cell of the assignee of the present application, Metallic Power, comprise a plurality of cells electrically coupled together in a serial fashion. Before use, each cell receives a mixture of zinc particles and electrolyte. The zinc particles in each cell form an anode bed. Each cell includes an electroactive zone where zinc undergoes electrolytic dissolution. In a traditional zinc/air fuel cell or "refuelable battery," the bottom portion of a full anode bed is in the electroactive zone and immediately adjacent to a cathode. For an example of traditional zinc/air fuel cells, see U.S. Pat. No. 5,434,020 to Cooper and U.S. patent application Ser. No. 09/353,422 to Gutierrez, et al., filed Jul. 15, 1999. The zinc in the remaining upper portion is in an inactive zone called the hopper, and does not undergo electrodissolution. This zinc is regarded as fuel. Another approach of the prior art is to completely replace the zinc electrode between discharges. For example, see U.S. Pat. No. 5,441,820 to Evans, et al. and U.S. Pat. No. 5,196,275 to Goldman, et al.

In the electroactive zone, the zinc dissolves, the particles reduce in diameter and the particle bed collapses, allowing particles to fall from the hopper into the electroactive zone. When the cell is refueled, which typically occurs at the end of the discharge period when the zinc fuel level in each cell reaches the bottom of the hopper, zinc pellets are fluidized in a stream of electrolyte and pumped into a feed tube, which runs the length of the cell stack. The feed tube discharges directly into each cell until each hopper is full of zinc. The discharge and refueling phases occur sequentially.

There are several problems with this approach to cell filling. They are: 1) high electrolytic shunt currents flow between the cells via the feed tube during refueling, 2) the filling procedure requires careful balancing of flow rates and zinc volume fraction to maximize zinc transfer rates while avoiding channel blockage, 3) the relatively long filling times (ten to twenty minutes for a typical application) that result even from the best zinc transfer rates, 4) the loss of the hopper volumes within the cell stack as active, power-producing volume, 5) the need to measure the zinc level in every hopper to get a completely reliable measure of remaining fuel, and 6) the difficulty of mechanically sealing the feed tube against the cell walls sufficiently to prevent dendrite growth between filling procedures.

First, this prior art approach leads to high electrolytic shunt currents flowing through the feed tube between the cells that reduce the efficiency of the fuel cell and can lead to dendrite formation and catastrophic short-circuits between cells. Sealing each cell from the feed tube near the junction of the feed tube and each cell inlet after cell filling can reduce the shunt currents. However, the presence of zinc pellets in this area makes reliable sealing difficult. Furthermore, such a seal is a mechanical device that needs some form of motive power and the ability to open and close on the receipt of an electrical signal, adding to the cost and complexity of the fuel cell.

Second, the filling procedure for this approach is quite time-consuming and requires careful control of flow rates and zinc volume fraction, because the pellets must fill each cell in sequence and after filling, the cell inlet holes and the feeding tube must be cleared of zinc pellets. Additionally, the rate of pellet flow required to minimize cell filling time causes problems. A principal advantage of the zinc/air fuel cell is that it allows fast refueling. However, with the traditional approach, the rate of electrolyte flow and the volume fraction of pellets control the rate of filling. If the flow rate is too high, the pressure can damage the cells. If the pellet fraction is too high, the pellets can accumulate and block the passageways.

A further disadvantage with this traditional approach is that the fuel to be consumed is stored within the fuel cell, i.e., in the hopper. The hopper occupies a significant portion of the cell volume, effectively reducing the cell volume available for electrochemical activity. It is undesirable to put the hopper zone within the cell frame because the cell frame is an expensive part of the fuel cell system.

Thus, what is needed is an electrochemical power source that maximizes the electroactive portion of each cell by having the electroactive zone occupy substantially all of the available volume of each cell. The cell design should cause minimal shunt currents between cells, and allow the cell to be constantly maintained in a full condition with fuel particles to maximize electrochemical activity. The cell should not require complex filling procedures or long filling times.

SUMMARY OF THE INVENTION

Accordingly, the present invention maximizes the electroactive zone in a metal/air fuel cell so that it occupies substantially the entire available space within the cell frame, inhibits the possibility of shunt currents between cells, and substantially maintains the fuel cell constantly full with metal fuel particles to maximize electrochemical activity.

The present invention provides a refuelable electrochemical power source having one or more cells adapted to employ particulate material electrodes. The one or more cells include a cell body defining an interior cell cavity, a flow path in the cell cavity through which particulate material and fluid flow, an electroactive zone occupying substantially all of the cell cavity except for the flow path, and a fluid mechanical device adjacent the flow path capable of substantially maintaining the electroactive zone in a constant full or maximum electroactivity condition.

Implementations of the above aspect of the invention may include any or all of the following. A plurality of cells, each cell including an elongated inlet conduit configured to reduce shunt currents between cells, wherein the plurality of cells includes an inlet manifold adapted to deliver particulate material and fluid to each cell via the elongated inlet conduits. Further, there is a fluid mechanical device that is located adjacent to or at least partially within the fluid flow path. The fluid mechanical device includes a plurality of baffles located at least partially within the fluid flow path, and the baffles are configured to direct particulate and fluid flow into the electroactive zone. The baffles are substantially vertically oriented and parallel with each other in the cell and each baffle terminates in a substantially wedge-shaped end located at least partially with the fluid flow path. The one or more cells including a plurality of cells, each cell including an elongated outlet conduit configured to reduce shunt currents between cells. Further, the plurality of cells includes an outlet manifold adapted to deliver particulate material and fluid not retained within the cells out of the cells via the elongated outlet conduits. The cell includes a bottom portion and a fluid outlet conduit in communication with the bottom portion for delivering the fluid and an electrochemical reaction product out of the cell. The one or more cells include a plurality of cells having a fluid outlet manifold in communication with the fluid outlet conduit of each cell for delivering the fluid and electrochemical reaction product out of the power source. The cell includes a cell cavity generally defining four quadrants, a first quadrant represents an upper corner of the cell cavity, a second quadrant represents the other upper corner of the cell cavity, a third quadrant represents a lower corner of the cell cavity below the first quadrant and a fourth quadrant represents the other lower corner of the cell cavity below the second quadrant, and the particulate material and the fluid flows into the first quadrant, the particulate and the fluid flows out of the second quadrant and the fluid without any significant amount of the particulate flows out of the fourth quadrant. The one or more cells together form a zinc/air fuel cell stack.

Another aspect of the invention involves a method of maintaining one or more cells of a refuelable electrochemical power source at a substantially constant full condition. The method includes providing a refuelable electrochemical power source having one or more electrochemical cells adapted to employ particulate material electrodes, the one or more cells including a cell body defining an interior cell cavity, a flow path in the cell cavity through which particulate material and fluid flow, an electroactive zone occupying substantially all of the cell cavity except for the flow path, and a fluid mechanical device adjacent the flow path adapted to maintain the electroactive zone in a substantially constant full, maximum electroactivity condition. The fluid mechanical device is further employed to circulate particulate material and fluid through the flow path in the one or more cells, past the fluid mechanical device, so that the electroactive zone of the one or more electrochemical cells is substantially maintained in a constant full or maximum electroactivity condition.

Implementations of the aspect of the invention described immediately above may include any or all of the following. Filling the electroactive zone of the one or more cells with particulate material and fluid before circulating the particulate material and fluid through the one or more cells. The one or more cells including a plurality of cells, each cell including an elongated inlet conduit configured to reduce shunt currents between cells and the plurality of cells include an inlet manifold adapted to deliver particulate material and fluid to each cell via the elongated inlet conduits. The fluid mechanical device is located at least partially within the fluid flow path and substantially circulating particulate material and fluid constantly through the flow path of the one or more cells includes circulating the particulate material and fluid past the fluid mechanical device. This causes the particulate material and fluid to flow into the electroactive zone of the cell so as to fill the electroactive zone and maintain the electroactive zone in a substantially constant full condition. The fluid mechanical device includes a plurality of baffles located at least partially within the fluid flow path, the baffles configured so as to direct particulate and fluid flow into any empty space between adjacent baffles.

The mechanical device substantially circulates particulate material and fluid constantly through the one or more cells, which includes circulating the particulate material and fluid past the baffles. Thus, the particulate material and fluid is caused to move into any empty space between adjacent baffles so as to fill the electroactive zone and maintain the electroactive zone in a substantially constant full condition. Circulating the particulate material and fluid includes circulating the particulate material and fluid at a flow rate so that when a space between adjacent baffles becomes full with particulate material, the particulate material and fluid flow past this area without clogging the flow path and subsequently fill any downstream spaces between baffles in a similar manner. This occurs until all the spaces between baffles, and hence the entire cell, is full. This flow may preferably be continuous so as to maintain the electroactive zone of each cell in a substantially constant full condition, or the flow may be intermittent or periodic so as to periodically refill the electroactive zones. In either case, the cells may be discharged during this flow if desired. The baffles are preferably, but not necessarily, oriented substantially vertical and in parallel with each other in the cell and each baffle preferably terminates in a substantially wedge-shaped end located at least partially with the fluid flow path. The one or more cells are zinc/air cells. The particulate material is zinc pellets and the fluid is potassium hydroxide. The cell includes a cell cavity generally defining four quadrants, a first quadrant represents an upper corner of the cell cavity, a second quadrant represents the other upper corner of the cell cavity, a third quadrant represents a lower corner of the cell cavity below the first quadrant and a fourth quadrant represents the other lower corner of the cell cavity below the second quadrant. The particulate material and the fluid flows into the first quadrant, the particulate and the fluid flows out of the second quadrant and the fluid, without any significant amount of the particulate, flows out of the fourth quadrant.

A further aspect of the present invention involves a refuelable electrochemical power source including one or more electrochemical cells adapted to employ particulate material electrodes. The one or more cells include a cell body defining an interior cell cavity, a flow path in the cell cavity through which particulate material and fluid flow, an electroactive zone occupying substantially all of the cell cavity except for the flow path, and means adjacent the flow path for maintaining the electroactive zone in a substantially constant full, maximum electroactivity condition.

A still further aspect of the present invention involves an onboard refueling system for a portable electrical power source. The onboard refueling system includes a source of particulate material and fluid and a refuelable electrochemical power source adapted to produce electrical power. The power source is in communication with the source of particulate material and fluid. The power source includes one or more electrochemical cells adapted to employ particulate material electrodes. The one or more cells include a cell body defining an interior cell cavity, a flow path in the cell cavity through which particulate material and fluid from the particulate material and fluid source flow, an electroactive zone occupying substantially all of the cell cavity except for the flow path, and a fluid mechanic device adjacent the flow path capable of maintaining the electroactive zone in a substantially constant full, maximum electroactivity condition. At least one pump is interconnected with the source of particulate material and fluid and the refuelable electrochemical power source. The pump is capable of imparting a substantially constant flow or an intermittent or periodic flow of particulate material and fluid from the particulate material and fluid source to the one or more cells.

BRIEF DESCRIPTION OF THE FIGURES

The present invention is described with reference to the accompanying drawings, wherein.

In the figures, like reference numbers generally indicate identical, functionally similar, and/or structurally similar elements.

DETAILED DESCRIPTION OF THE PREFERRED EMBODIMENTS

All of the examples of the present invention presented herein are associated with a zinc/air fuel cell and system. It is important to note, however, that the present invention can be applied to other types of power sources, fuel cells, and/or batteries. For example, the present invention may be applied to other metal/air fuel cells, such as, but without limitation, aluminum/air fuel cells, lithium/air fuel cells or iron/air fuel cells. More generally, the invention could be applied to any electrochemical device using solid particulate matter as an oxidant or reductant, or systems with an oxidant other than air, such as oxygen, hydrogen peroxide, bromine, or liquids with the ability to carry a dissolved oxidant. The present invention can also be applied to metal recovery systems. An example of a metal recovery system is a system that recovers zinc from aqueous solution by applying electricity. Accordingly, the examples used herein depicting zinc/air fuel cells should not be construed to limit the scope and breadth of the present invention.

Figure 1:
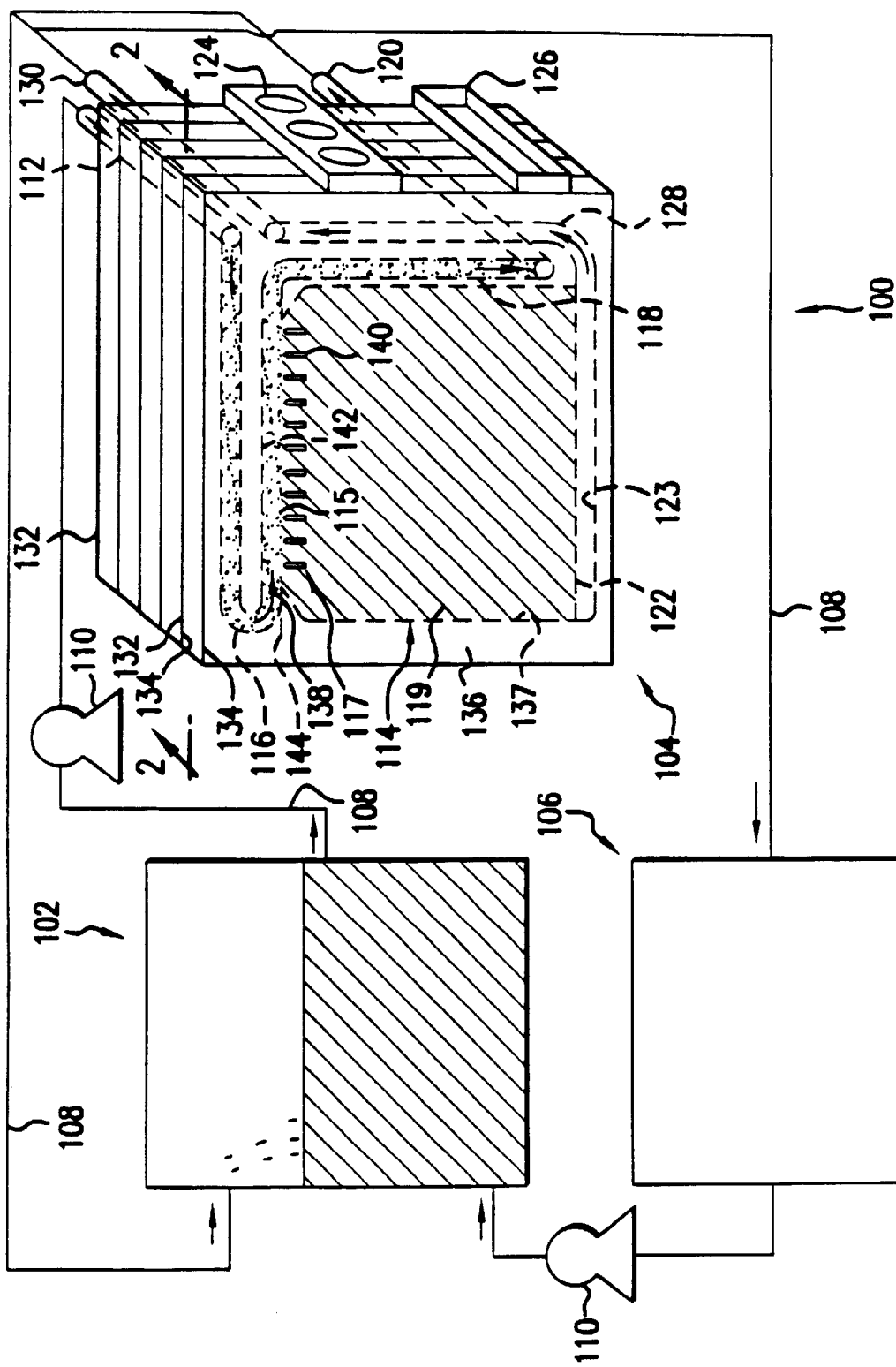
FIG. 1 is a schematic illustration of a metal/air fuel cell system constructed in accordance with an embodiment of the invention.

With reference to FIG. 1, a zinc/air fuel cell system 100 constructed in accordance with an embodiment of the invention will now be described. The basics of a zinc/air fuel cell system, which should be sufficient background for the reader to understand the present invention, have been described above in the background of the invention. However, additional background on zinc/air fuel cell systems can be found in U.S. patent application Ser. No. 09/449,176, filed on Nov. 24, 1999, entitled "System and Method for Preventing the Formation of Dendrites in a Metal/Air Fuel Cell, Battery or Metal Recovery Apparatus," U.S. Pat. No. 5,952,117, filed on Oct. 24, 1996, entitled "Method and Apparatus for Refueling an Electrochemical Power Source," and U.S. patent application Ser. No. 09/353,422, filed on Jul. 15, 1999, entitled "Fuel Particle Feeding Apparatus for Electrochemical Power Source and Method of Making the Same," all of which are hereby incorporated herein by reference in their entirety as though set forth in full.

Figure 2:
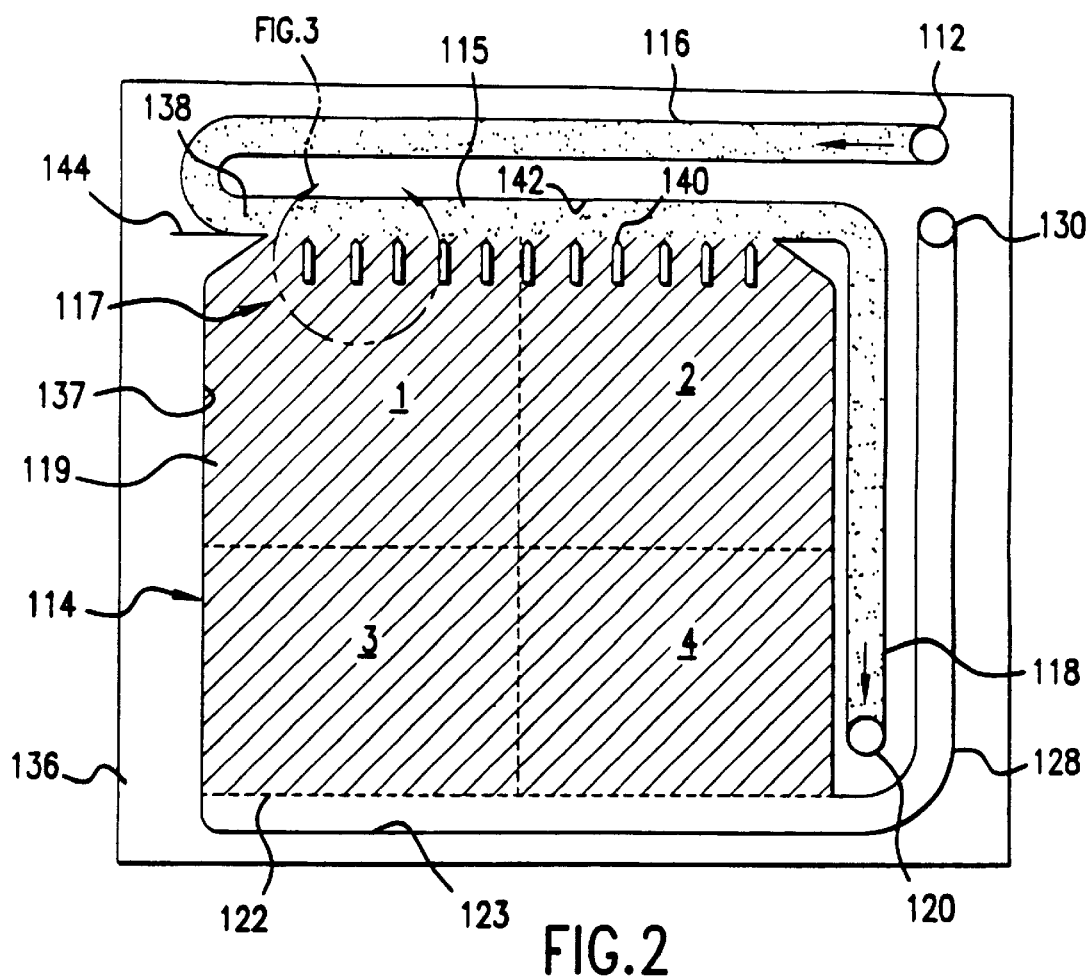
FIG. 2 is a cross-sectional view of a metal/air fuel cell constructed in accordance with an embodiment of the invention, taken along line 2—2 of FIG. 1.

With reference to FIGS. 1 and 2, the zinc/air fuel cell system 100 includes a zinc fuel tank 102, a zinc/air fuel cell stack or power source 104, an electrolyte management unit 106, a piping system 108, one or more pumps 110, and one or more valves (not shown) that define a closed flow circuit for the circulation of zinc particles and electrolyte during fuel cell operation.

Zinc pellets in a flow medium such as concentrated potassium hydroxide (KOH) electrolyte solution are located in the zinc fuel tank 102. In another implementation, the particles may be a type of metal other than zinc such as and without limitation, aluminum (aluminum/air fuel cell), lithium, (lithium/air fuel cell), iron (iron/air fuel cell) or a particulate material other than metal that can act as an oxidant or reductant. In another implementation, the flow medium may be a fluid, i.e., liquid or gas, other than an electrolyte. The zinc fuel tank 102 and the rest of the system 100 may be part of an integral assembly. Alternatively, the zinc fuel tank 102, the electrolyte management unit 106, or a combination of these and/or other system components, may be a separate, detachable part of system 100.

The zinc and electrolyte solution are pulsed or continuously fed from the zinc fuel tank 102, through the piping system 108, and into an inlet manifold 112 of the cell stack 104. Piping system 108 may include one or more fluid connecting devices, e.g., tubes, conduits, elbows, etc., for connecting the components of the system 100.

The power source 104 includes a stack of one or more bipolar cells 114, each generally defining a plane and coupled together serially. Five such cells 114 are shown in FIG. 1 for illustrative purposes, however, the number of cells 114 in the power source 104 may vary depending on the desired application of the power source 104. Each cell 114 has a total open circuit potential of M volts. The power source 104 has an open-circuit potential P equal to M volts×N cells, where N is the number of cells in the power source 104.

Each cell 114 includes an air positive electrode 132 that occupies an entire surface or side of the cell 114 and a zinc negative electrode current collector 134 that occupies an opposite entire surface or side of the cell 114. A porous and electrically conductive substance may be inserted between the electrodes 132, 134 of adjacent cells 114 so that air can be blown therethrough for supplying oxygen to each air positive electrode 132. The bipolar stack 104 may be created by simply stacking the cells 114 such that the negative electrode current collector 134 of each cell is in physical contact with the positive electrode surface 132 of the adjacent cell 114, with the porous and electrically conductive substance therebetween. As stated, this series connection provides a total open circuit potential (between the first negative electrode 134 and the last positive electrode 132) of P volts. In this fashion, extremely compact high voltage bipolar stacks 104 can be built. Further, because no wires are used between the cells 114 and the electrodes 132, 134 comprise large surface areas, the internal resistance between the cells 114 is extremely low.

The inlet manifold 112 preferably runs through the cells 114 of the power source 104, perpendicular to the planes defined by the cells 114. The inlet manifold 112 distributes fluidized zinc to the cells 114 via inlet conduits or cell filling tubes 116. Each inlet conduit 116 lies within its respective cell 114.

The zinc particulates and electrolyte flow through a flow path 115 in each cell 114, generally within the plane of the cell 114. The method of delivering particles to the cells 114 is a flow-through method. A dilute stream of pellets in flowing KOH electrolyte is delivered to the flow path 115, at the top of the cell 114 via the conduit 116. The stream flows through the flow path 115, across the zinc particle bed, and exits on the opposite side of the cell 114 via outlet tube 118. Some of the pellets in the stream are directed by baffles 140 into electroactive zone 119. Pellets that remain in the flow stream are removed from the cell 114. This flow-through method (along with baffles 140) allows the electroactive zone 119 to occupy substantially all of the cell cavity and remain substantially constantly filled with zinc particles. As a result, the electrochemical potential of each cell 114 is maximized per cell cavity volume.

The pumps 110 may be used to control the flow rate of the electrolyte and zinc through the system 110. The proper flow rate through the system 100 is important. If the flow rate is too high, the pressure can damage the cells 114. If the flow rate is too low, it may be difficult to maintain the cells 114 in a substantially constant full condition. The particle fraction in the electrolyte is also important. If the particle fraction is too high, the particles may accumulate and block the passageways of the system 100. If the pellet fraction is too low, it may be difficult to maintain the cells 114 in a substantially constant full condition. Because there is a substantially constant flow of electrolyte and zinc across the top of the cells 114, the pellet fraction is diluted compared to pellet fractions used in zinc/air fuel cell systems in the past. This helps to inhibit accumulation and blockage in the passageways and reduces shunt currents between cells 114. One way of controlling the pellet fraction in the electrolyte is with a screening or filtering mechanism (not shown) on the outlet of the zinc/air fuel tank 102. The flow rate of the zinc and electrolyte through the system 100 and the zinc pellet fraction should be sufficient to maintain maximum electrochemical activity in the cell 114.

The flow rate going into each individual cell is determined by two flow requirements:
  a) The flow rate $Q_e$ through the particle bed necessary for the electrochemical reaction to take place. $Q_e$ is determined experimentally and can vary according to the electrical performance of the pellet bed.
  b) The flow rates Qsi necessary to keep the pellets fluidized throughout the conduits or channels both internal and external to the cell. Qsi is called the Stokes flow rate and, in the ith conduit, is defined via the classical expression for minimal fluidization velocity Us by Stokes. Us is a function of the pellet diameter, the density of the pellet material and both the viscosity and density of the carrier fluid. In the case of the present work, the fluid is preferably potassium hydroxide. Stokes equation is:

$$U_S = \left[\left(\frac{4}{3}\right)\left(\frac{gD_p}{f}\right)\left(\frac{\rho_p - \rho_f}{\rho_p}\right)\right]^2, \quad (1)$$

where $D_p$ is the diameter of the particle, $\rho_p$ the density of the particle, $\rho_f$ the density of the fluid, g is the gravitational constant of 9.81 m/s², and f is the friction factor that depends on the Reynolds Number.

The local stokes flow rate Qs is defined as:

$$Qs = (Us * A), \qquad (2)$$

where A is the local cross-sectional area.

The flow rate Qsi that is necessary to keep the pellets fluidized throughout the ith conduit or channel is equal to:

$$Qsi = (Us * Amaxi), \qquad (3)$$

where Amaxi is the maximum cross-sectional area in the ith conduit. Also, we define Uf as the velocity of the fluid. For proper fluidization, Q must in all conduits and channels be chosen such that the flow velocity is greater than the Stokes velocity at all points:

$$(Uf/Us) > 1 \text{ everywhere.} \qquad (4)$$

The most stringent requirement on the flow rate is determined at the widest point in each conduit, where the velocity is slowest. If relation (4) holds there, it will hold at all other points in the conduit. This gives the requirement on the flow rate Qi through each conduit or channel to keep the pellets fluidized throughout the conduit or channel:

$$Qi > (Us * Amaxi) \qquad (5)$$

The minimum total flow rate into each cell will therefore depend on the number and configuration of channels and must be sufficient to ensure that the flow rate through the particle bed exceeds $Q_e$ and the flow rate through each conduit or channel satisfies relation (5).

The pellet volume fraction Xp is the volume of pellets divided by the sum of the volume of liquid and the volume of pellets. In the flow path region it should be in the range $0.001 < Xp < 0.6$, but preferably in the range $0.01 < Xp < 0.2$. This fraction should be small enough to minimize the interactions between pellets so as to ensure they obey Stokes law and will be always fluidized, but large enough to ensure adequate particle fill rates for the cell without requiring unduly high liquid flow rates and pumping power.

As the zinc particles dissolve in the electroactive zone 119 of the cell 114, soluble zinc reaction product, zincate, is produced. The zincate passes through a screen mesh or filter 122 near a bottom 123 of the cell 114 and is washed out of the active area of cell 114 with electrolyte that also flows through the cell 114 and filter 122. The screen mesh or filter 122 causes the electrolyte that exits the cell 114 to have a negligible amount of or no zinc particles. The flow of electrolyte through the cell 114 not only removes the soluble zinc reaction product and, therefore, reduces precipitation of discharge products in the electroactive zone 119, it also removes unwanted heat, helping to prevent the cell 114 from overheating.

The electrolyte exits the cell 114 and cell stack 104 via an electrolyte outlet conduit 128 and electrolyte outlet manifold 130, respectively. The electrolyte is drawn into the electrolyte management unit 106 though the piping system 108. A pump (not shown) may be used to draw electrolyte into the electrolyte management unit 106. The electrolyte management unit 106 is used to remove the zincate and/or heat from the electrolyte so that the same electrolyte can be added to the zinc fuel tank 102 for zinc fluidization purposes. The electrolyte management unit 106, like the zinc fuel tank 102, may be part of an integral assembly with the rest of the system 100 or it may be a separate, detachable part of the system 100.

A constant supply of oxygen is required for the electrochemical reaction in each cell 114 to take place. To this end, one embodiment of the system 100 may include a plurality of air blowers 124 and air outlet 126 on the side of cell stack 104 in order to supply a flow of air (comprising the oxygen required for the electrochemical reaction) to the air cathodes of each cell 114. A porous substance such as a nickel foam may be disposed between each cell 114 to allow the air to reach the air cathode of each cell and flow through the cell stack 104. In another implementation, an oxidant other than air such as, but without limitation, pure oxygen, bromine, or hydrogen peroxide, may be supplied to each cell 114 for the electrochemical reaction to take place.

With reference to FIG. 2, the flow into and out of the cell 114 may be described using a quadrant system, i.e., quadrants 1–4, of the cell cavity. Quadrant 1 or first quadrant represents an upper corner of the cell cavity, quadrant 2 or second quadrant represents the other upper corner of the cell cavity, quadrant 3 or third quadrant represents a lower corner of the cell cavity below quadrant 1, and quadrant 4 or fourth quadrant represents the other lower corner of the cell cavity below quadrant 2. In a preferred embodiment of the invention, zinc particulate and electrolyte enters the cell cavity via the inlet conduit 116 into quadrant 1 and exits the cell cavity via the outlet conduit 118 from quadrant 2. Electrolyte and reaction product preferably exit the cavity via electrolyte outlet conduit 128 from quadrant 4. Based on results of experiments and computational modeling, the inventors determined that this combination worked well for optimizing fluid circulation in the cell 114. Although quadrants 1–4 are illustrated in an upper left hand corner, upper right hand corner, lower left hand corner, and lower right hand corner, respectively, in an alternative embodiment of the invention the quadrants may be assigned different quadrant numbers, e.g., quadrants 1–4 may represent an upper right hand corner, upper left hand corner, lower right hand corner, and lower left hand corner.

The manifolds 112, 120, 130 may run perpendicular to the planes defined by the cells 114 of the stack 104 in order to communicate the cells 114 with the manifolds 112, 120, 130 via the respective conduits. It will be readily apparent to those skilled in the art that any or all of the manifolds may take any well-known manifold configuration known in the art other that that shown and described herein and may be located outside of the cells 114. Further, although the inlets of the manifolds 112, 120, 130 are shown at one end of the stack 104, implementations of the stack 104 may include the inlets of any or all of the manifolds at locations other than that shown and described herein.

Figure 3:
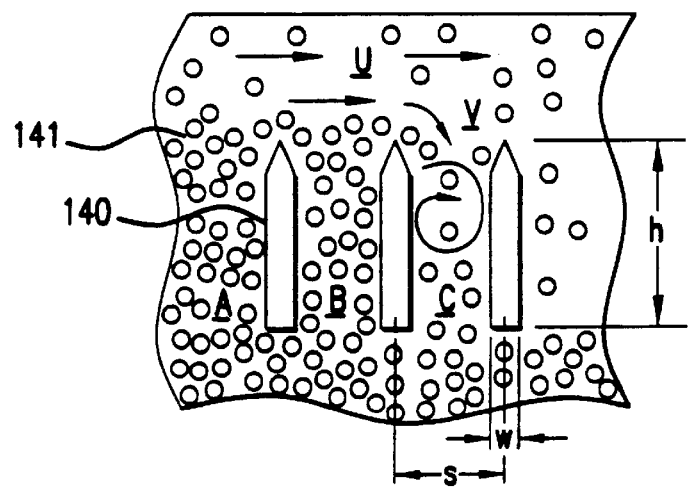
FIG. 3 is an enlarged cross-sectional view of an embodiment of a plurality of baffles illustrated in FIG. 2.

With reference specifically to FIGS. 2 and 3, the zinc/air fuel cell 114 will now be described in more detail. The zinc/air fuel cell 114 is defined by a fuel cell frame or body 136. The fuel cell body 136 generally defines a cell cavity 137. The fuel cell cavity 137 communicates with the inlet manifold 112 via the cell filling tube 116. Electrolyte and zinc are introduced into the cell filling tube 116 and flow into the cell cavity 137 through a cell inlet 138. The electrolyte and zinc flow through the flow path 115, across the top of the zinc pellet bed. As the electrolyte and zinc flow across the top of the zinc pellet bed, some zinc particles are directed from the flow stream to the pellet bed in the electroactive zone 119. The remaining pellets exit with the electrolyte though the outlet conduit 118 and outlet manifold 120, and return to the zinc tank 102. The cell filling tube 116 is narrow and sufficiently long, about 15 cm in a preferred embodiment, to reduce total shunt currents to less than 10 amps. This substantially minimizes electrical conductivity and parasitic current leakage between the cells 114 through the electrolyte. This eliminates the need for a sealing device between the manifold 112 and the cell inlet 138. When the cell 114 is not in use and the pumps 110 are not operating, the feed tube 116 will drain, breaking the shunt current flow path.

In the past, because electrolytic shunt currents flow between the cells via the manifold tube, each cell was sealed from the manifold tube after cell filling to reduce the shunt currents. Not only was it difficult to build a reliable sealing method that would close in the presence of zinc pellets, but closing the cell off to the manifold tube inhibits having a substantially constant zinc and electrolyte flow across the top of the zinc pellet bed to maintain the full bed height. The addition of the long, thin cell filling tube 116 between the inlet manifold 112 and cell inlet 138 reduces shunt currents to acceptable level without the need for a sealing device, allowing substantially constant zinc and electrolyte flow for maintaining full bed height and, hence, full electrochemical activity in the anode bed.

With reference specifically to FIG. 3, the baffles 140 are a fluid mechanical device 117 adapted to maintain the electroactive zone of each cell 114 in a substantially constant full, maximum electroactivity condition. In a preferred embodiment, the baffles 140 are fixed near a top 142 of the cell 114, substantially vertically oriented and parallel with each other. However, the baffles need not be vertically oriented or parallel with each other. Additionally, each baffle 140 preferably terminates in a substantially wedge-shaped end 141 located at least partially within the fluid flow path 115. The baffles 140 are sized, shaped and spaced, i.e., configured, to create fluid stream vortices between the baffles 140 if an empty or partially empty pellet drop zone, i.e., the space between and/or below the baffles 140, exists.

These vortices between the baffles 140 cause some of the electrolyte and zinc particles to flow down between the baffles 140, filling the empty pellet drop zone between and/or below the baffles 140. The baffles 140 may extend down through the electroactive zone, even to the bottom of the cell 114 if desired. Once the pellet level in a pellet zone, e.g., zone A or B, between any two adjacent baffles 140 is filled to the top of the baffles 140, i.e. to a top 144 of the electroactive zone 119, the pellets no longer accumulate and move into the next baffle zone, e.g., zone C. In this way, the whole upper surface of the pellet bed is maintained at the fill line 144 by providing a flow of electrolyte and zinc pellets through the flow path 115 and over the ends 141 of the baffles 140. Thus, the baffles 140 are a fluid mechanic device capable of maintaining the electroactive zone 119 in a substantially constant full condition.

Figure 8:
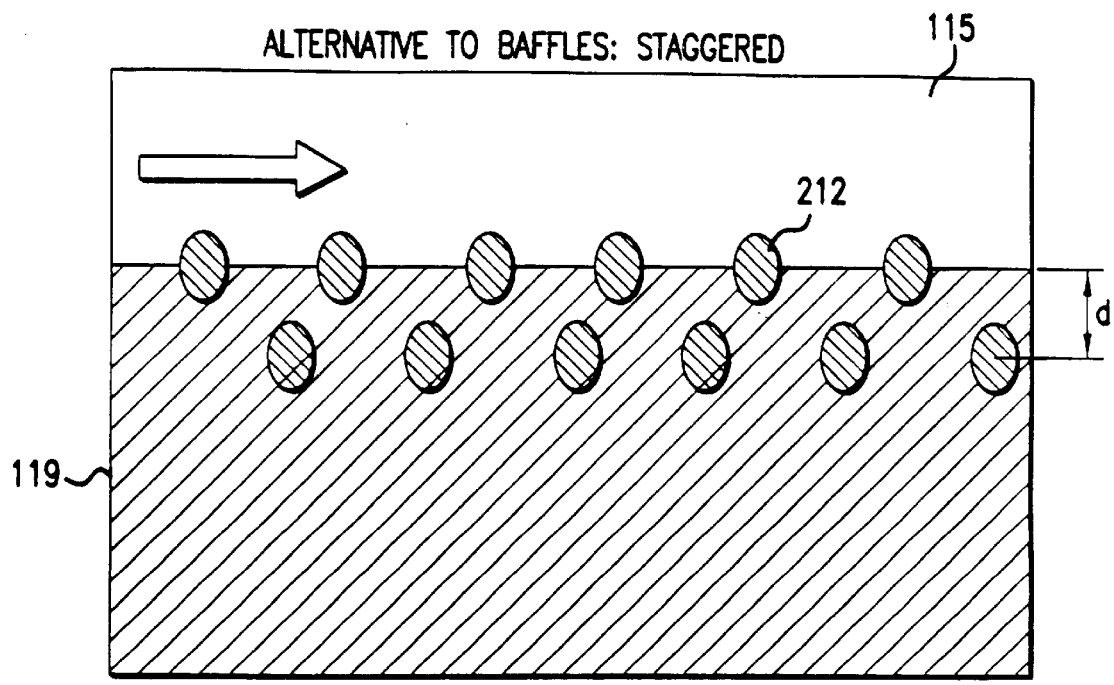
FIG. 8 is a cross-sectional view, similar to FIG. 3, of a fluid mechanical device capable of maintaining an electrochemical cell in a substantially full, maximum electroactivity condition in accordance with an additional embodiment of the invention.
Figure 9:
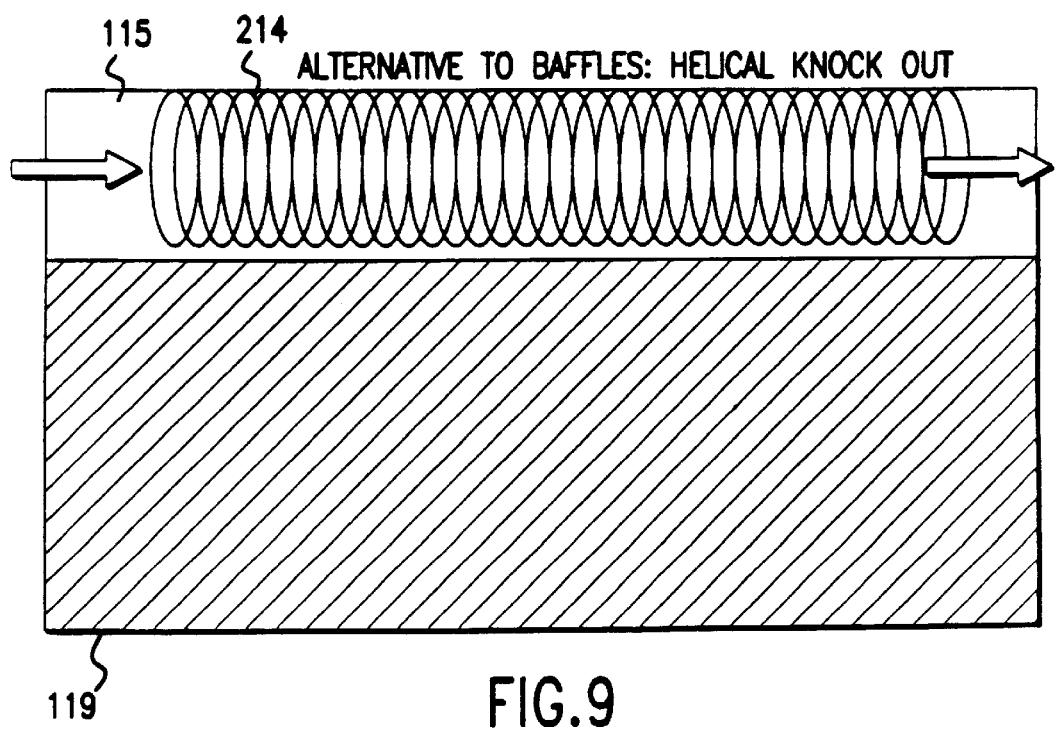
FIG. 9 is a cross-sectional view, similar to FIG. 3, of a fluid mechanical device capable of maintaining an electrochemical cell in a substantially full, maximum electroactivity condition in accordance with an additional embodiment of the invention.

Because the zinc pellets can be maintained at the fill line 144, the electroactive zone 119 of the fuel cell 114 can also be located up to this point, making the electroactive zone 119 of the fuel cell 114 substantially larger per cell volume than has been available in the past. It is important to note that other fluid mechanic devices, including other baffle configurations, can be used for this same purpose. With reference to FIG. 8, an example of an alternative embodiment of a fluid mechanic device capable of maintaining the electroactive zone 144 in a substantially constant full condition is shown. In this embodiment, staggered pegs 212 replace the baffles 140. With reference to FIG. 9, an example of an alternative embodiment of a fluid mechanic device capable of maintaining the electroactive zone 144 in a substantially constant full condition is shown. In this embodiment, a helical "knockout" coil 214 serves the same function as the baffles 140. The most important function of these embodiments of the fluid mechanic device is to create a difference between the fluid velocity in the flow path 115 (relatively high velocity) and the electroactive zone 119 (relatively low velocity) while enabling particles to travel from the flow path 115 into the electroactive zone 119. This allows particles in the flow path 115 to fill the electroactive zone 119 without high velocity fluid propelling a substantial number of particles back out of the electroactive zone 119. This function is not essential for an acceptable fluid mechanic device, but it is preferred.

The flow rate U (see FIG. 3) of pellets is designed to maintain the pellet bed at a substantially constant optimum height, i.e., the fill line 144, under electrodissolution conditions. However, even when the fuel cells 114 generate the maximum amount of current, the rate of decrease in the pellet bed height is very slow. Accordingly, if the flow rate U through the flow path 115 is substantially constant, the rate of pellet feeding is low. Consequently, the electrolyte flow rate and the pellet volume fraction are relatively low. In an alternative implementation, the pellet bed may be maintained substantially constant at the fill line 144 by a periodic or intermittent flow, e.g., pulsed flow, of pellets and electrolyte through the one or more cells 114. In this implementation, the pellet and electrolyte flow may also be substantially constant to ensure that fill rate is proportional to the rate of decrease in the pellet bed height caused by electrodissolution.

Figure 4:
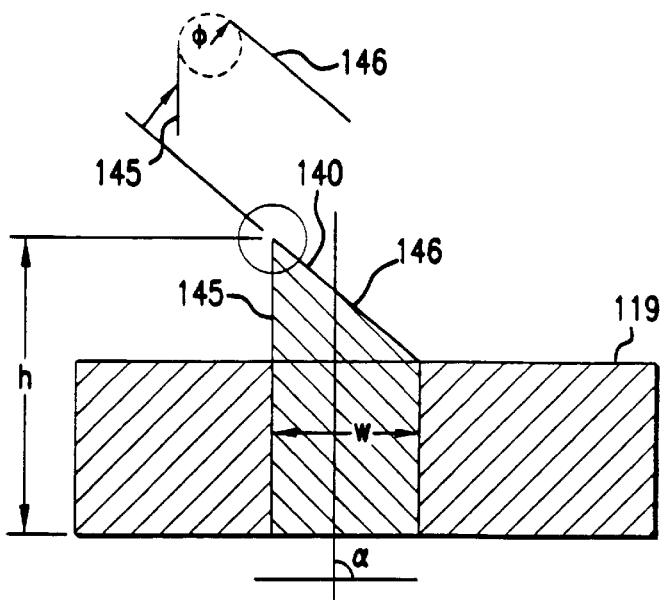
FIG. 4 is an enlarged cross sectional view of one of the baffles illustrated in FIGS. 2 and 3.

With reference to FIG. 4, an enlarged view of a single baffle 140 is shown. Other important variables or baffle design parameters for maintaining the pellet bed at an optimum height are the height h of the baffles 140, the width w of the baffles 140, the separation distance s between adjacent baffles 140, the angle of inclination $\alpha$ of the baffles 140, and the radius of curvature $\phi$ of the border of attack at the top of the baffles 140. In one embodiment, the angle $\alpha$ is the angle between the long dimension of a baffle and the direction of fluid flow in the flow path adjacent said baffle. The variables involved in the proper design of the baffles 140 (height, width separation and top edge shape) are ruled by the proper detachment of the boundary layer that is needed at the top of the baffle 140. When the boundary layer detaches, it creates down stream a vortex of the dimensions of the confined space. The flow between the baffles 140 is usually referred to as cavity flow. The circulating velocity within the vortex depends, among many things, on the main flow velocity in the flow path and on the shape of the edge of the baffle 140. Sharp edges cause fast detachments with resulting fast vortex velocities. Smooth edges (airfoil like) cause smooth detachments and very low velocity vortices down stream.

The detachment of a boundary layer can generally be described by Blasius's and Prantl's equations together. Therefore, the design parameters of the baffles 140 strictly emanate from the fundamental equations of boundary layer detachment. The separation between baffles 140 can be calculated using Seban's equation for a given flow and a given fluid. Each alternative embodiment of the fluid mechanic device (such as shown in FIGS. 8 and 9) is also ruled by the same equations and a new set of heights, separations and shapes will arise from the equations applied to each problem in particular. As a rule of thumb, vortices have a size given by the physical space that confines them (Prandtl's mixing length). Typically, boundary layers reattach at approximately 6 perturbation heights away from the point of detachment.

The design parameters for the baffles (s, w, h, α, φ) can be expressed in dimensionless form as follows:

$$s'=(s/D), \qquad (6)$$

where D, the hydraulic diameter of the flow path, is equal to four times the average area of the flow path cross-section divided by the average perimeter of the flow path cross-section;

$$w=(w*n/L), \qquad (7)$$

where n is the number of baffles and L is the length of the flow path region;

$$h'=(h/H), \qquad (8)$$

where H is the cell height excluding the flow path; and $$\phi'=(\phi/w). \qquad (9)$$

where φ' is the radius of curvature of the tip nearest the flow path of a baffle divided by the width of a baffle.

The best ranges for these dimensionless parameters are:
0.1<s'<30 and preferably 1<s'<3;
0<w'<0.95 and preferably 0.05<w'<0.3;
0<h'<1 and preferably 0.001<h'<0.2;
Arcos (s/h)≦α≦90° and preferably α=90°; and
0<φ'<0.25 and preferably 0<φ'<0.01.

In FIG. 4, the border of attack is shown to be on the leading (upstream) face 145 of the baffle 140, but it may also be on the trailing (downstream) face 146 or anywhere in between.

Figure 5:
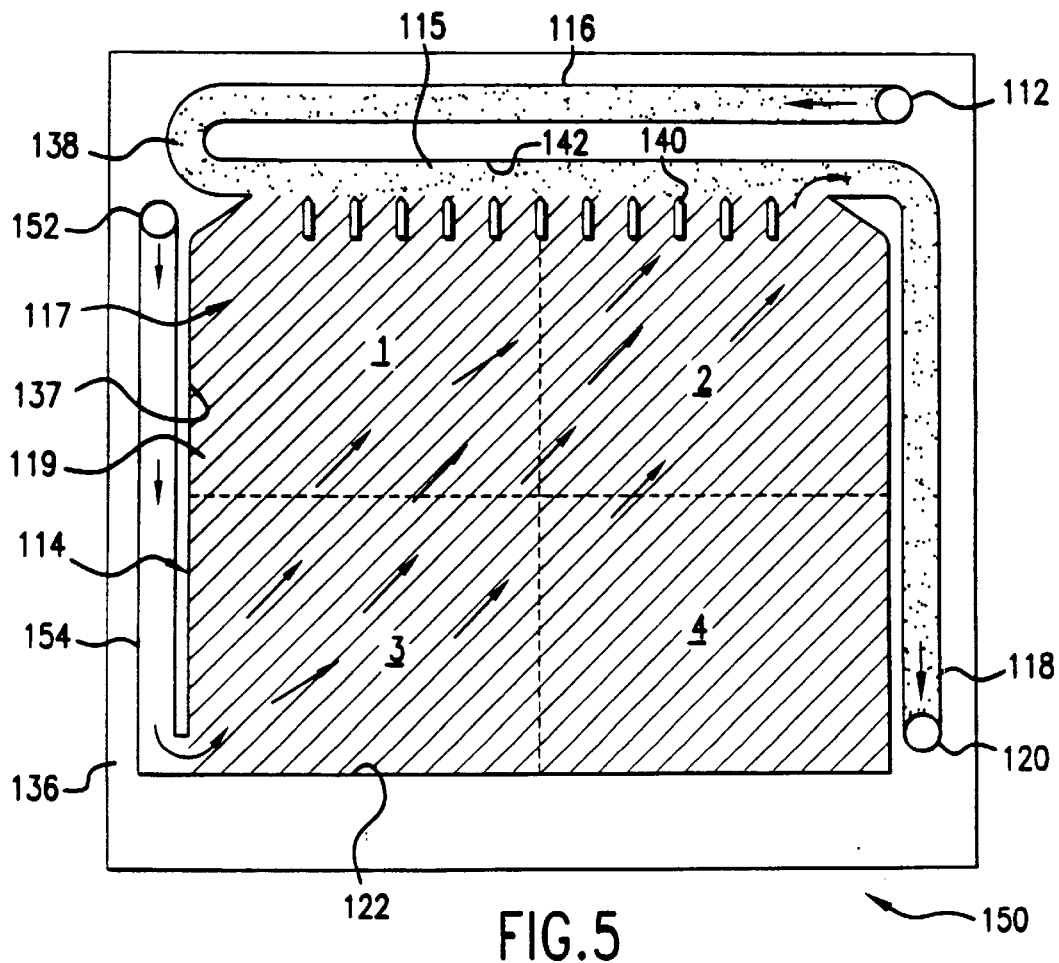
FIG. 5 is a cross-sectional view, similar to FIG. 2, of a metal/air fuel cell constructed in accordance with an additional embodiment of the invention.

With reference to FIG. 5, a zinc/air fuel cell 150 constructed in accordance with an alternative embodiment of the invention will now be described. The zinc/air fuel cell 150 is similar to the zinc/air fuel cell 114 described above, except the electrolyte outlet conduit 128 and manifold 130 are replaced with an electrolyte inlet conduit 152 and manifold 154. In this embodiment, zinc particulate and electrolyte enters the cell cavity via the inlet conduit 116 into quadrant 1 and exits the cell cavity via the outlet conduit 118 from quadrant 2. Electrolyte supplied by the electrolyte management unit 106 enters quadrant 3 of the fuel cell cavity via the manifold 154 and the electrolyte inlet conduit 152. The electrolyte, with reaction product, flows up and across the cell cavity and exits with the zinc and electrolyte flow via the outlet conduit 118 from quadrant 2. This embodiment of the zinc/air fuel cell is advantageous because for moderate flow rates and high cell electrical discharge rates, it may be advantageous for electrolyte to flow upward through the electroactive zone.

In an alternative embodiment of the invention, the conduit 152 and manifold 154 described above with respect to FIG. 5, may be used to remove electrolyte and reaction product from the fuel cell cavity at quadrant 3 instead of supplying electrolyte to the fuel cell cavity at this location. This would cause the supplied electrolyte to flow downwards, into quadrant 3, and out the conduit 152. In this embodiment of the invention, zinc particulate and electrolyte would still enter the cell cavity via the inlet conduit 116 into quadrant 1 and exit the cell cavity via the outlet conduit 118 from quadrant 2. A screen or filter (not shown) similar to that described above with respect to FIGS. 1 and 2 would preferably be located near the bottom 122 of the cell 150 to prevent zinc particulate from exiting the cell 150 with the electrolyte. Other embodiments, with different locations and configurations of particle and fluid inlets and outlets, are possible. The essential elements of any useful embodiment are that it allows for fluid flow through substantially all of the electroactive zone to remove heat and reaction product, and that it allows for the introduction of fresh zinc particles into the electroactive zone.

Figure 6:
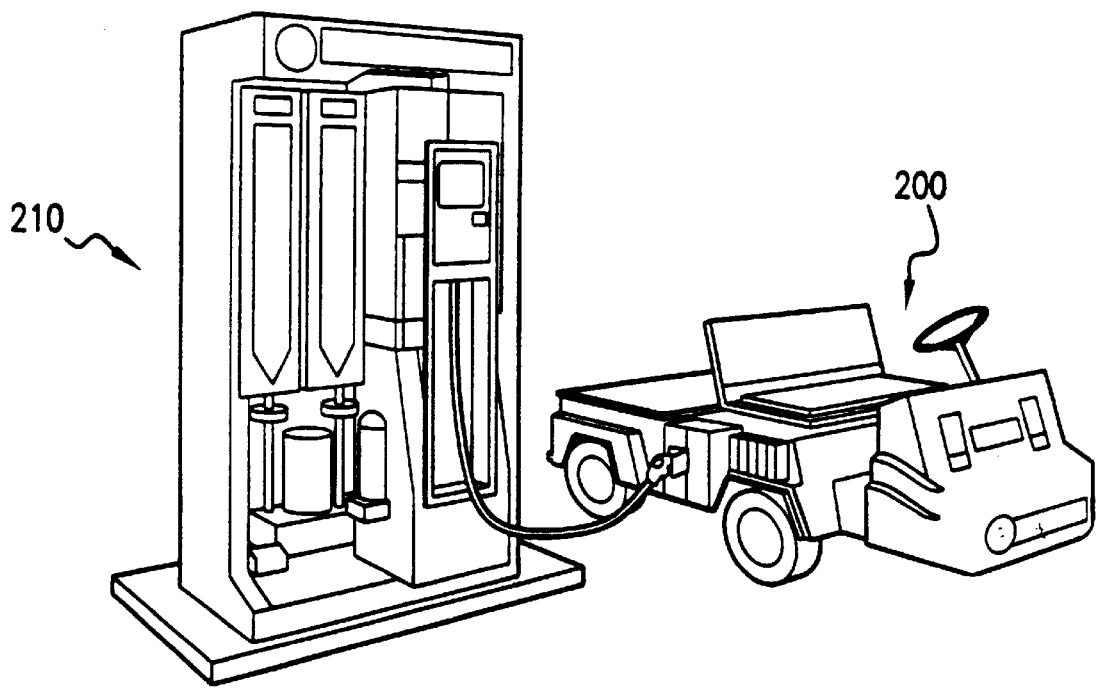
FIG. 6 is a perspective view of a recycling/refueling system and an industrial cart incorporating a metal/air fuel cell system constructed in accordance with an embodiment of the invention.
Figure 7:
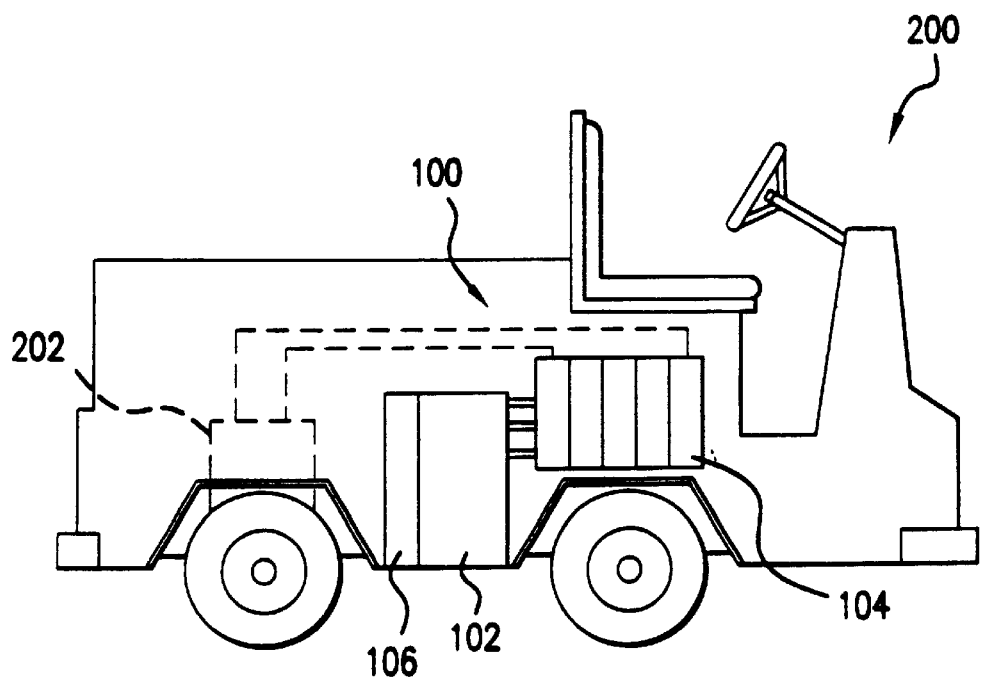
FIG. 7 is a side elevational view of the industrial cart of FIG. 4.

With reference to FIGS. 6 and 7, an industrial cart 200 is equipped with the metal/air fuel cell system 100 for powering an electric motor 202 that drives the cart 200. It will be readily understood by those skilled in the art that the industrial cart 200 is just one of numerous portable or movable electrically powered devices that the metal/air fuel cell system 100 may be used to power. Other examples include, but without limitation, portable or stationary electrical generators, lift trucks, floor sweepers and scrubbers, automobiles, golf carts, electrically-powered transportation vehicles, auxiliary power units, and commercial lawn and garden equipment.

Fuel tank 102 may be refilled at a recycling/refueling system 210. This can generally be accomplished with very high zinc transfer rates, for example by using a high velocity, high zinc volume-fraction flow through a large diameter hose, compared to the much slower transfer rates achievable by refilling a plurality of cell hoppers, as in the prior art. During refueling, the spent zinc, which has been converted to zinc oxide (ZnO) in the electrolyte management unit 106, is transferred to the zinc recycling/refueling system 210, as shown in FIG. 6. The recycling/refueling system 210 uses electrolysis to convert the zinc oxide back to zinc metal in pellet form using AC electricity from an electrical outlet, e.g., an electrical wall outlet. The pellets are stored in a tank in the recycling/refueling system 210, and, when required, are pumped in a stream of flowing electrolyte into the fuel tank 102 of the zinc/air fuel cell system 100. This may be accomplished either simultaneously with the zinc oxide removal from the electrolyte management unit 106, or in sequence with the removal. Further, this may be accomplished when the fuel tank 102 is mounted to the fuel cell (as a permanent, integral component or otherwise), or when the fuel tank is detachable from the fuel cell (see U.S. Pat. No. 5,952,117.

Figure 10:
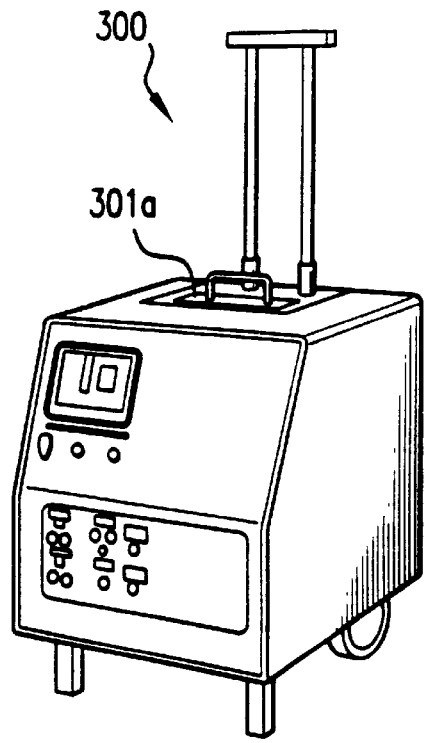
FIG. 10 illustrates an embodiment of the invention comprising a cartridge refuelable stationary or portable power source.
Figure 11:
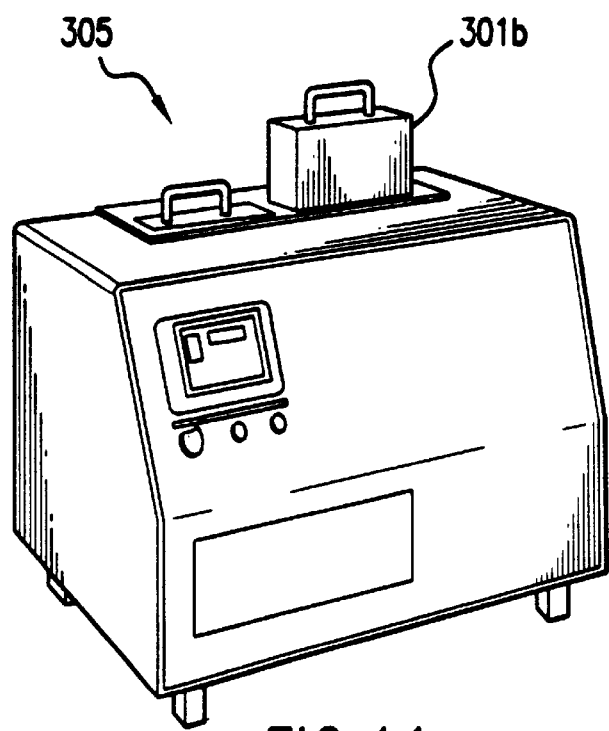
FIG. 11 illustrates a recycling unit for generating fuel cartridges for use with the power source of FIG. 10.

With reference to FIG. 10, a cartridge refuelable mobile or stationary power source 300 in accordance with the subject invention is illustrated. In this embodiment, fuel tank 102 and/or electrolyte management unit 106 form a detachable cartridge 301a which, when exhausted, can be replaced by a regenerated cartridge 301b provided by recycling unit 305 as shown in FIG. 11. The recycling unit 305 can then be used to regenerate the exhausted cartridge 301a for later use by the power source 300.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A refuelable electrochemical power source, comprising: at least one electrochemical cell, the cell including a cell body defining an interior cell cavity, a flow path through which particulate material and fluid flow, an electroactive zone within the cell cavity, and a fluid mechanical device for creating at least one vortex that allows particulate material to pass from the flow path into the electroactive zone.

2. A refuelable electrochemical power source, comprising: at least one electrochemical cell, the cell including a cell body defining an interior cell cavity, a flow path through which particulate material and fluid flow, an electroactive zone within the cell cavity, and fluid mechanical device means for creating at least one vortex that allows particulate material to pass from the flow path into the electroactive zone.

3. A power system comprising:

a source of particulate material and fluid;

the refuelable electrochemical power source of claim 1 or 2; and an interconnector for interconnecting said source of particulate material and fluid and said refuelable electrochemical power source.

4. A method of providing particulate material to one or more cells of a refuelable electrochemical power source having at least one electrochemical cell, the cell having a cell body defining an interior cell cavity, and an electroactive zone within the cell cavity, the method comprising:

allowing particulate material and fluid to flow along a flow path; and creating at least one vortex that allows at least a portion of the particulate material to pass into the electroactive zone.

5. A method of providing particulate material to one or more cells of a refuelable electrochemical power source having at least one electrochemical cell, the cell having a cell body defining an interior cell cavity, and an electroactive zone within the cell cavity, the method comprising:

a step for allowing particulate material and fluid to flow along a flow path; and a step for creating at least one vortex that allows at least a portion of the particulate material to pass into the electroactive zone.

* * * * *